(12) United States Patent
Imoto

(10) Patent No.: US 10,415,734 B2
(45) Date of Patent: Sep. 17, 2019

(54) PIPE COUPLING

(71) Applicant: NITTO KOHKI CO., LTD., Tokyo (JP)

(72) Inventor: Yuki Imoto, Tokyo (JP)

(73) Assignee: NITTO KOHKI CO., LTD., Tokyo (JP)

(*) Notice: Subject to any disclaimer, the term of this patent is extended or adjusted under 35 U.S.C. 154(b) by 260 days.

(21) Appl. No.: 15/647,614

(22) Filed: Jul. 12, 2017

(65) Prior Publication Data

US 2017/0307121 A1    Oct. 26, 2017

Related U.S. Application Data

(63) Continuation of application No. PCT/JP2016/079105, filed on Sep. 30, 2016.

(30) Foreign Application Priority Data

Oct. 2, 2015 (JP) .................................. 2015-196827

(51) Int. Cl.
*F16L 37/23* (2006.01)
*F16L 37/14* (2006.01)
(Continued)

(52) U.S. Cl.
CPC ............. *F16L 37/146* (2013.01); *F16L 37/23* (2013.01); *F16L 37/2445* (2013.01);
(Continued)

(58) Field of Classification Search
CPC .................................. F16L 37/23; F16L 37/22
(Continued)

(56) References Cited

U.S. PATENT DOCUMENTS 2,503,495 A * 4/1950 Koester .................... F16L 37/23
                                                        285/277
3,140,072 A * 7/1964 Scinto, Jr. ............... F16L 37/23
                                                        285/277
(Continued)

FOREIGN PATENT DOCUMENTS

JP          60-30545        9/1985
JP          63-32475        8/1988
(Continued)

OTHER PUBLICATIONS

International Search Report dated Nov. 22, 2016 in International (PCT) Application No. PCT/JP2016/079105.

*Primary Examiner* — David Bochna
(74) *Attorney, Agent, or Firm* — Wenderoth, Lind & Ponack, L.L.P.

(57) ABSTRACT

A female pipe coupling member includes a coupling body and a sleeve 138 disposed around a cylindrical peripheral wall portion of the coupling body. The sleeve has a locking element receiving hole extending therethrough from an inner peripheral surface to an outer peripheral surface. When the sleeve is in a locking element releasing position where the locking element receiving hole radially aligns with a locking element, the locking element is received in the locking element receiving hole to assume an unlocking position. The locking element receiving hole is configured to block the locking element from passing therethrough radially outward and thus holds the locking element in the unlocking position from outside.

10 Claims, 4 Drawing Sheets

(51) Int. Cl.
- *F16L 37/244* (2006.01)
- *F16L 37/252* (2006.01)
- F16L 37/32 (2006.01)
- F16L 37/113 (2006.01)
- F16L 37/22 (2006.01)

(52) U.S. Cl.
CPC ........... *F16L 37/252* (2013.01); *F16L 37/113* (2013.01); *F16L 37/22* (2013.01); *F16L 37/32* (2013.01)

(58) Field of Classification Search
USPC .................................................. 285/276, 277
See application file for complete search history.

(56) References Cited

U.S. PATENT DOCUMENTS

| | | | | |
|---|---|---|---|---|
| 3,165,340 | A * | 1/1965 | Kuehl | F16L 37/23 285/316 |
| 3,817,560 | A * | 6/1974 | Guertin | F16L 37/23 285/277 |
| 6,237,631 | B1 | 5/2001 | Giesler et al. | |
| 6,908,118 | B2 * | 6/2005 | Fumioka | F16L 37/23 285/277 |
| 2005/0067837 | A1 | 3/2005 | Alexander et al. | |

FOREIGN PATENT DOCUMENTS

| | | |
|---|---|---|
| JP | 3-11446 | 3/1991 |
| JP | 2014-202310 | 10/2014 |

\* cited by examiner

PIPE COUPLING

TECHNICAL FIELD

The present invention relates to a female pipe coupling member and a pipe coupling comprising a female pipe coupling member and a male pipe coupling member.

BACKGROUND ART

Among pipe couplings of the type comprising a male pipe coupling member and a female pipe coupling member, there is well known a pipe coupling configured to detachably couple a male pipe coupling member and a female pipe coupling member by using a locking element(s), as disclosed, for example, in Patent Literature 1. A female pipe coupling member used in such a pipe coupling generally has a coupling body configured to receive a male pipe coupling member, a locking element radially displaceably retained in a locking element retaining hole of the coupling body, and a sleeve disposed around the outer peripheral surface of the coupling body to restrict the position of the locking element. When the female pipe coupling body and the male pipe coupling body are coupled to each other, the locking element projects from the inner peripheral surface of the coupling body to engage an engagement groove of the male pipe coupling member, and the locking element is kept engaged in the engagement groove by being held from radially outside by the inner peripheral surface of the sleeve, thereby undetachably locking the male pipe coupling member to the female pipe coupling member. To decouple the male pipe coupling member from the female pipe coupling member, the sleeve is displaced relative to the coupling body so that an enlarged-diameter portion provided in the inner peripheral surface of the sleeve radially aligns with the locking element, thereby allowing the locking element to be displaced radially outward from the engagement groove of the male pipe coupling member. If, in this state, the male pipe coupling member is pulled out of the female pipe coupling member, the locking element is displaced radially outward by a side wall of the engagement groove and disengaged from the engagement groove.

Thus, when the male pipe coupling member is decoupled from the female pipe coupling member, the locking element is displaced radially outward toward the enlarged-diameter portion of the sleeve. The enlarged-diameter portion has an inner peripheral surface configured to cover the locking element and the locking element retaining hole from radially outside. The inner peripheral surface of the enlarged-diameter portion abuts against the outer top of the locking element to restrict the radially outward displacement of the locking element, thereby preventing the locking element from being completely dislodged from the locking element retaining hole.

CITATION LIST

Patent Literature

Patent Literature 1: Japanese Patent Application Publication No. 2014-202310

SUMMARY OF INVENTION

Technical Problem

The flow rate available through a pipe coupling is mainly determined by the size of the flow path of the pipe coupling. It is therefore necessary to increase the size of the flow path in order to increase the maximum flow rate. However, if the flow path is increased in size, the diameter of the pipe coupling also increases inevitably. In the female pipe coupling member of the above-described pipe coupling, the locking element is placed in a position where the locking element does not project from the inner peripheral surface of the coupling body when the female pipe coupling member is not coupled to the male pipe coupling member, and in order to prevent the locking element from being completely dislodged from the locking element retaining hole when the locking element is placed in the above-described position, the sleeve is provided with a structure such as the above-described enlarged-diameter portion that holds the whole locking element from radially outside. Therefore, the outer diameter of the female pipe coupling member amounts to the sum of the inner diameter of the coupling body plus at least the thickness of the locking element and the thickness of a portion of the sleeve that covers the whole locking element. Such a configuration has heretofore hindered reduction in the outer diameter of the pipe coupling.

The present invention has been made in view of the above-described problem of the conventional technique, and an object of the present invention is to provide a female pipe coupling member having a structure capable of reducing the size of the outer diameter thereof relative to the flow path as compared with the conventional female pipe coupling member, and also to provide a pipe coupling comprising such a female pipe coupling member and a male pipe coupling member.

Solution to Problem

The present invention provides a female pipe coupling member detachably couplable to an associated male pipe coupling member. The female pipe coupling member includes a coupling body having a cylindrical peripheral wall portion configured to receive the male pipe coupling member. The coupling body further has a locking element retaining hole(s) radially extending through the cylindrical peripheral wall portion. The female pipe coupling member further includes a locking element(s) disposed in the locking element retaining hole. The locking element is displaceable between a locking position where the locking element partly projects inward from the cylindrical peripheral wall portion to lock the male pipe coupling member received in the cylindrical peripheral wall portion and an unlocking position where the locking element is located outward of the locking position to unlock the male pipe coupling member and where the locking element partly projects outward from the cylindrical peripheral wall portion. Further, the female pipe coupling member includes a sleeve having an inner peripheral surface and an outer peripheral surface. The sleeve is disposed to circumferentially surround the cylindrical peripheral wall portion and displaceable along an outer peripheral surface of the cylindrical peripheral wall portion. The sleeve has a locking element receiving hole(s) extending through the sleeve from the inner peripheral surface to the outer peripheral surface. The locking element receiving hole has an inner opening peripheral edge portion opening on the inner peripheral surface, an outer opening peripheral edge portion opening on the outer peripheral surface, and a hole inner peripheral surface extending between the inner opening peripheral edge portion and the outer opening peripheral edge portion. The sleeve is displaceable between a locking element releasing position where the locking element receiving hole radially aligns with the locking element retaining hole to receive a part of the locking element projecting outward from the cylindrical peripheral wall portion, thereby allowing the locking element to assume the unlocking position, and a locking element holding position where the locking element receiving hole does not radially align with the locking element retaining hole and where the inner peripheral surface of the sleeve engages and holds the locking element in the locking position. When the sleeve is in the locking element releasing position, one selected from a group of the inner opening peripheral edge portion, outer opening peripheral edge portion and hole inner peripheral surface of the locking element receiving hole engages the locking element to block the locking element from passing through the sleeve radially outward.

In the female pipe coupling member of the present invention, the locking element placed in the unlocking position is received in the locking element receiving hole, which is a through-hole. Accordingly, in contrast to the conventional female pipe coupling member having an enlarged-diameter portion covering and holding the locking element placed in the unlocking position from radially outside, the female pipe coupling member of the present invention does not have such a portion that covers the locking element and is therefore capable of reducing the thickness of the sleeve by an amount corresponding to the portion covering the locking element. Accordingly, it is possible to reduce the outer diameter of the female pipe coupling member relative to the flow path as compared with the conventional female pipe coupling member.

Preferably, the locking element may be a spherical member, and the locking element receiving hole may be a circular hole having a diameter smaller than that of the locking element.

More preferably, the configuration may be as follows. The inner peripheral surface of the sleeve has a recess formed thereon, and the inner opening peripheral edge portion of the locking element receiving hole opens into the recess and is thus located away from the outer peripheral surface of the coupling body. The inner opening peripheral edge portion engages the locking element when the sleeve is in the locking element releasing position.

With the above-described configuration, the inner opening peripheral edge portion of the locking element receiving hole contacts the spherical locking element at a more outward point of the latter. Consequently, when the sleeve is displaced from the locking element releasing position to the locking element holding position, the inner opening peripheral edge portion of the locking element receiving hole applies force to the locking element in a direction closer to the inward direction. Accordingly, the locking element can be displaced radially inward to the locking position even more smoothly.

Preferably, the configuration may be such that when the locking element is in the unlocking position, the radial top of the locking element is substantially flush with the outer peripheral surface of the sleeve.

With the above-described configuration, a female pipe coupling member using a locking element is made capable of substantially minimizing the size of the outer diameter of the female pipe coupling member relative to the flow path.

Preferably, the female pipe coupling member may further include a first guide part provided on the coupling body, and a second guide part provided on the sleeve. When the sleeve is displaced from the locking element releasing position to the locking element holding position, the first guide part and the second guide part engage each other to guide the sleeve toward the locking element holding position.

In the female pipe coupling member of the present invention, it is necessary to align the locking element receiving hole and the locking element in the radial direction in order to bring the sleeve into the locking element releasing position. In this regard, it is possible to facilitate the operation of the sleeve for aligning the positions of the locking element receiving hole and the locking element by guiding the sleeve toward the locking element releasing position through the first and second guide parts.

In addition, the present invention provides a pipe coupling including any of the above-described female pipe coupling members, and a male pipe coupling member detachably couplable to the female pipe coupling member.

Embodiments of a pipe coupling according to the present invention will be explained below based on the accompanying drawings.

DESCRIPTION OF EMBODIMENTS

Figure 1:
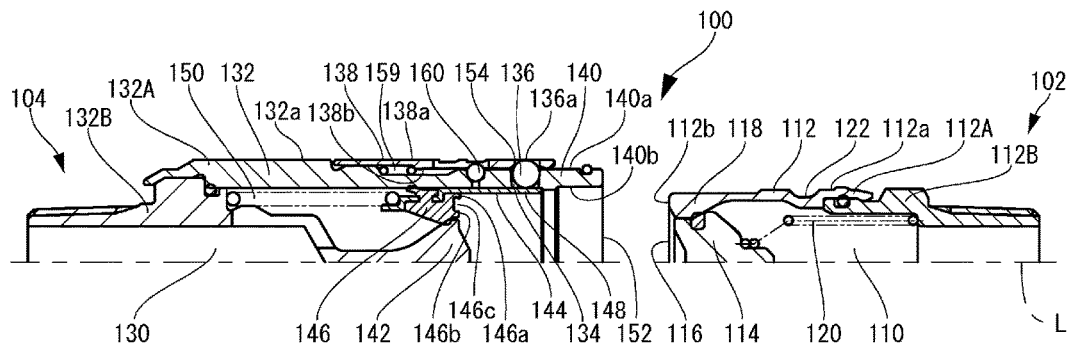
FIG. 1 is a sectional view of a pipe coupling according to a first embodiment of the present invention, showing the pipe coupling in an uncoupled state.

As shown in FIG. 1, a pipe coupling 100 according to a first embodiment of the present invention comprises a male pipe coupling member 102 and a female pipe coupling member 104, which are detachably couplable to each other.

The male pipe coupling member 102 comprises a cylindrical male coupling body 112 having a male flow path 110, a valve element 114 disposed in the male flow path 110 displaceably in the direction of a longitudinal axis L of the male flow path 110, and a spring 120 pressing the valve element 114 toward a valve seat portion 118 provided at a forward end opening 116 of the male coupling body 112. The male flow path 110 is closed as the valve element 114 is pressed against the valve seat portion 118 by the urging force of the spring 120. The male coupling body 112 has an annular locking element engaging groove 122 formed on an outer peripheral surface 112a thereof. The locking element engaging groove 122 is engageable with locking elements 136 (described later). The illustrated male coupling body 112 comprises a forward cylindrical part 112A and a rear cylindrical part 112B, which are coupled in coaxial relation to each other. However, the forward cylindrical part 112A and the rear cylindrical part 112B may be integrally formed together to constitute the male coupling body 112.

The female pipe coupling member 104 comprises a cylindrical female coupling body 132 having a female flow path 130, a locking element(s) 136 disposed in a locking element retaining hole(s) 134 formed in the female coupling body 132, and a sleeve 138 disposed over an outer peripheral surface 132a of the female coupling body 132. The female coupling body 132 has a cylindrical peripheral wall portion 140 configured to receive the male pipe coupling member 102. The locking element retaining hole 134 is formed to radially extend through the cylindrical peripheral wall portion 140. The female coupling body 132 further has a valve seat portion 142 disposed in the center of the female flow path 130. Between the valve seat portion 142 and the cylindrical peripheral wall portion 140 is disposed a slide valve 144 slidably in the direction of the longitudinal axis L. The slide valve 144 comprises an annular valve element 146 sealingly engageable with the valve seat portion 142, and a cylindrical valve element support member 148 retaining the valve element 146 and sliding relative to an inner peripheral surface 140b of the cylindrical peripheral wall portion 140. The slide valve 144 is urged toward a forward end opening 152 of the female coupling body 132 by a spring 150. The female flow path 130 is closed as the valve element 146 is pressed against the valve seat portion 142 by the urging force of the spring 150. The sleeve 138 has a circular locking element receiving hole 154 extending therethrough from an inner peripheral surface 138b to outer peripheral surface 138a thereof. The locking element receiving hole 154 has a diameter smaller than that of the locking element 136 to prevent the locking element 136 from passing therethrough radially outward. The illustrated female coupling body 132 comprises a forward cylindrical part 132A and a rear cylindrical part 132B, which are coupled in coaxial relation to each other. The reason for this is that the valve seat portion 142 is integrally formed with the rear cylindrical part 132B. An alternative arrangement may be such that the forward cylindrical part 132A and the rear cylindrical part 132B are integrally formed together to constitute the female coupling body 132, and that a valve seat part formed separately from the female coupling body 132 is connected to the latter.

The valve element 146 has at the forward end thereof an annular outer lip portion 146a and an annular inner lip portion 146b, which project forward (rightward as seen in the figures). The outer and inner lip portions 146a and 146b form a vacuum suction space 146c therebetween. As will be stated later, when the male pipe coupling member 102 is inserted into the female pipe coupling member 104, a forward end portion 112b of the male coupling body 112 abuts against the valve element 146, and at that time, the outer and inner lip portions 146a and 146b of the valve element 146 are pressed into a flatter shape by the forward end portion 112b of the male coupling body 112. Consequently, the air in the vacuum suction space 146c is discharged by a predetermined amount, resulting in the vacuum suction space 146c being brought into a compressed state. If, in this state, the male coupling body 112 is displaced forward relative to the valve element 146, the vacuum suction space 146c is evacuated (i.e. brought into a vacuum state), thus generating a vacuum suction force pulling the valve element 146 forward.

Figure 4:
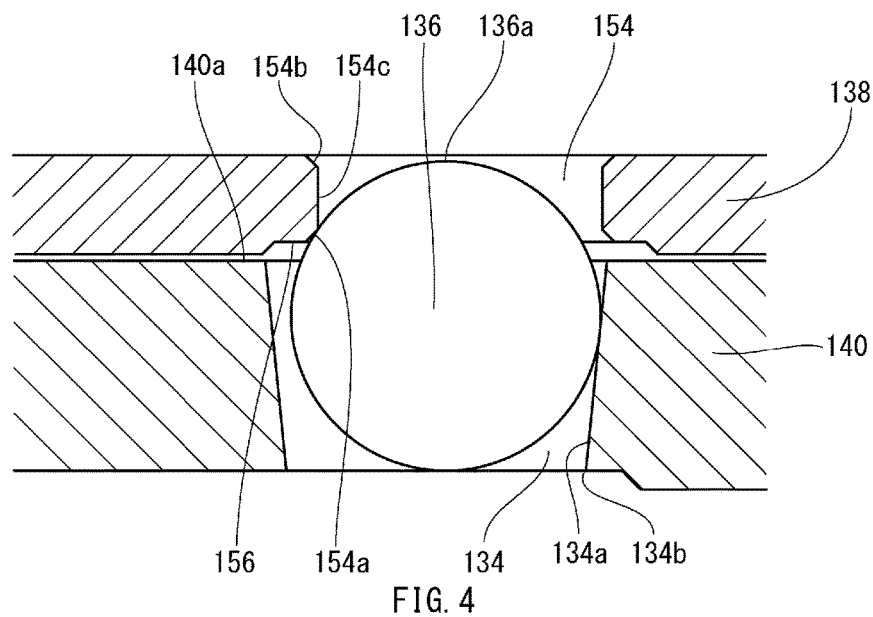
FIG. 4 is an enlarged view showing a locking element, a locking element retaining hole, and a locking element receiving hole.

As shown in FIG. 4, the inner peripheral surface 138b of the sleeve 138 is provided with a recess 156. The locking element receiving hole 154 has an inner opening peripheral edge portion 154a opening on the inner peripheral surface 138b of the sleeve 138, an outer opening peripheral edge portion 154b opening on the outer peripheral surface 138a, and a hole inner peripheral surface 154c extending between the inner opening peripheral edge portion 154a and the outer opening peripheral edge portion 154b. The inner opening peripheral edge portion 154a opens into the recess 156 and is thus located away from an outer peripheral surface 140a of the female coupling body 132. The locking element retaining hole 134 of the female coupling body 132 has a tapered configuration such that an inner peripheral surface 134a thereof becomes narrower as the distance from the outer peripheral surface 140a increases toward the radially inner side of the female coupling body 132, so that an inner opening portion 134b of the locking element retaining hole 134 that opens on the inner peripheral surface of the female coupling body 132 is smaller in diameter than the locking element 136. Thus, the locking element 136 is prevented from radially inwardly passing through and falling off the locking element retaining hole 134.

When the pipe coupling 100 is in the uncoupled state shown in FIG. 1, the slide valve 144 of the female pipe coupling member 104 is in a state where the valve element 146, which is urged forward by the spring 150, is pressed against the valve seat portion 142, and the valve element support member 148 is located radially inward of the locking element 136 and the locking element retaining hole 134. The locking element 136 is in an unlocking position where the locking element 136 is supported from the inner side by the valve element support member 148 of the slide valve 144 and where a part of the locking element 136 projects from the outer peripheral surface 140a of the cylindrical peripheral wall portion 140 of the female coupling body 132 and is received in the locking element receiving hole 154 of the sleeve 138. Although the sleeve 138 is constantly urged by a spring 159 toward the forward end of the female pipe coupling member 104 (rightward as seen in the figures), the sleeve 138 is held in locking elements releasing position shown in FIG. 1 by engagement of the inner opening peripheral edge portion 154a of the locking element receiving hole 154 with the locking element 136. The sleeve 138 has a thickness reduced to such an extent that when the sleeve 138 is held in the locking element releasing position, a radially outer top 136a of the locking element 136 is substantially flush with the outer peripheral surface 138a of the sleeve 138, as shown in FIG. 4.

Figure 2:
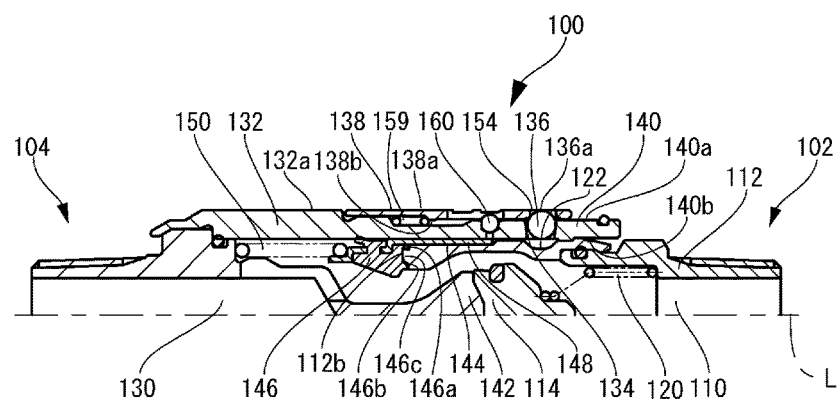
FIG. 2 is a sectional view of the pipe coupling in FIG. 1, showing the pipe coupling in a state where a male pipe coupling member has been inserted in a female pipe coupling member.

As the male pipe coupling member 102 is inserted into the female pipe coupling member 104 of the pipe coupling 100, which is in the uncoupled state shown in FIG. 1, the forward end portion 112b of the male coupling body 112 abuts against the valve element 146 of the slide valve 144 and pushes in the slide valve 144 rearward of the female pipe coupling member 104 (leftward as seen in the figures), thereby opening the female flow path 130. At the same time, the valve seat portion 142 of the female coupling body 132 abuts against the valve element 114 of the male pipe coupling member 102 and pushes in the valve element 114 rearward of the male pipe coupling member 102 (rightward as seen in the figures), thereby opening the male flow path 110. Consequently, the female flow path 130 and the male flow path 110 are communicated with each other, as shown in FIG. 2. At this time, the outer and inner lip portions 146a and 146b of the valve element 146 are pressed into a flatter shape by the forward end portion 112b of the male coupling body 112, so that the vacuum suction space 146c is compressed, and the air therein is discharged by a predetermined amount.

Figure 3:
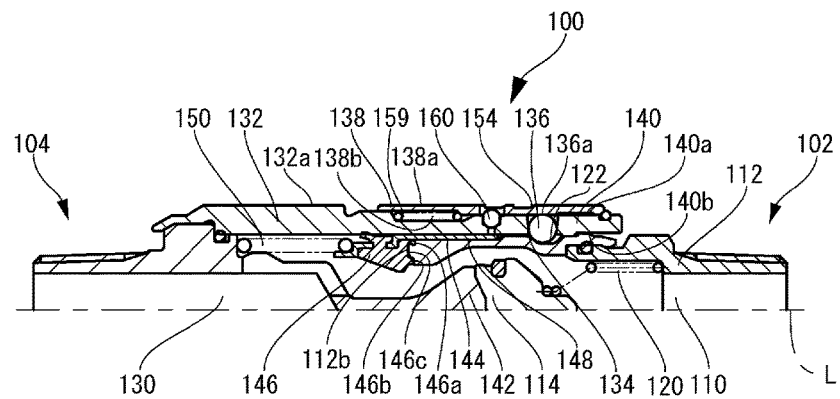
FIG. 3 is a sectional view of the pipe coupling in FIG. 1, showing the pipe coupling in a coupled state.

When the locking element engaging groove 122 of the male pipe coupling member 102 reaches a position just inward of the locking element 136, as shown in FIG. 2, the locking element 136 is pressed radially inward by the inner opening peripheral edge portion 154a of the locking element receiving hole 154, which is formed in the sleeve 138, so that the locking element 136 leaves the locking element receiving hole 154 inwardly, resulting in the locking element 136 assuming a locking position where, as shown in FIG. 3, a part of the locking element 136 projects inward from the cylindrical peripheral wall portion 140 of the female coupling body 132 and engages the locking element engaging groove 122. Consequently, the sleeve 138 is displaced forward (rightward as seen in the figure) by the urging force of the spring 159 to reach a locking element holding position where the inner peripheral surface 138b of the sleeve 138 presses the locking element 136 from the outer side to hold the locking element 136 in the locking position. When the locking element 136 is held in the locking position, the male pipe coupling member 102 is locked to the female pipe coupling member 104 through the locking element 136, and thus the female pipe coupling member 104 and the male pipe coupling member 102 are coupled to each other. It should be noted that because the inner opening peripheral edge portion 154a of the locking element receiving hole 154 is located away from the outer peripheral surface 140a of the female coupling body 132, as has been stated above, when the pipe coupling 100 is in the uncoupled state shown in FIG. 1, the inner opening peripheral edge portion 154a engages the locking element 136, which is in the unlocking position, at a more outward point of the locking element 136 than in a case where the inner opening peripheral edge portion 154a is not configured as in this embodiment. Accordingly, the direction in which the inner opening peripheral edge portion 154a applies a force pressing the locking element 136 becomes closer to the radially inward direction of the female coupling body 132. Thus, when the pipe coupling reaches the position shown in FIG. 2, the locking element 136 is displaced smoothly to the locking position.

To decouple the male pipe coupling member 102 and the female pipe coupling member 104, which are in the coupled state shown in FIG. 3, the sleeve 138, which is in the locking element holding position, is displaced to the locking element releasing position shown in FIG. 2 to align the locking element receiving hole 154 radially with the locking element 136 and the locking element retaining hole 134. Consequently, the locking element 136 becomes displaceable radially outward from the locking position to an unlocking position where a part of the locking element 136 projects outward from the cylindrical peripheral wall portion 140. If, in this state, the male pipe coupling member 102 is pulled out of the female pipe coupling member 104, the locking element 136 is pressed outward by a sloped side of the locking element engaging groove 122 and displaced to the unlocking position where a part of the locking element 136 is received in the locking element receiving hole 154. In addition, the locking element 136 is supported from the inner side by the valve element support member 148 of the slide valve 144, thereby being held in the unlocking position. When the male pipe coupling member 102 is pulled out of the female pipe coupling member 104 and thus the forward end portion 112b of the male coupling body 112 is moved in such a manner that the forward end portion 112 separates relatively from the valve element 146 of the slide valve 144, the vacuum suction space 146c is expanded to create a vacuum therein, so that a vacuum suction force is generated between the forward end portion 112b of the male coupling body 112 and the valve element 146 of the slide valve 144. Therefore, even if the slide valve 144 cannot be displaced by only the urging force of the spring 150 due to an increase in frictional resistance between the slide valve 144 and the female coupling body 132, for example, the slide valve 144 is pulled forward by the male coupling body 112 and can therefore be returned to the position shown in FIG. 1 even more surely. The sleeve 138 is held in the locking element releasing position shown in FIG. 1 by engaging with the locking element 136 in the direction of the longitudinal axis L.

Figure 5:
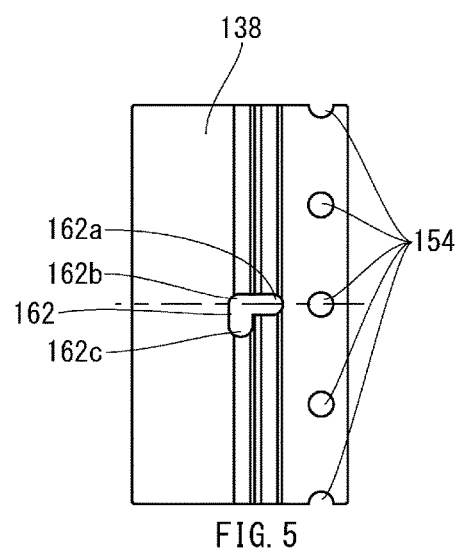
FIG. 5 is a development of a sleeve of the pipe coupling shown in FIG. 1.
Figure 6:
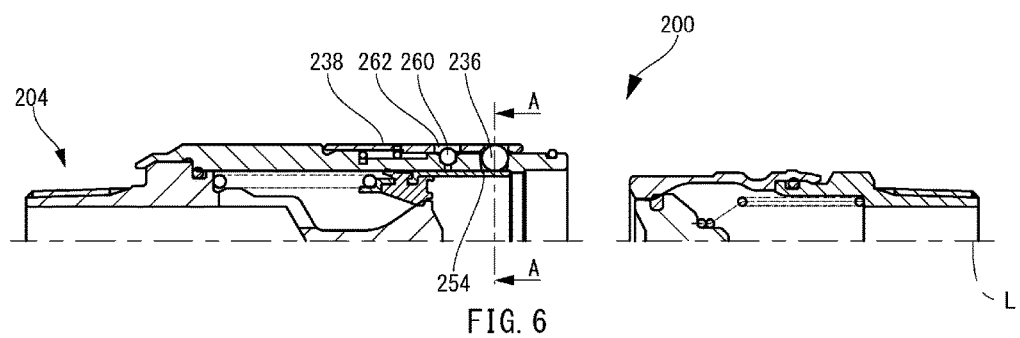
FIG. 6 is a sectional view of a pipe coupling according to a second embodiment of the present invention, showing the pipe coupling in an uncoupled state.
Figure 7:
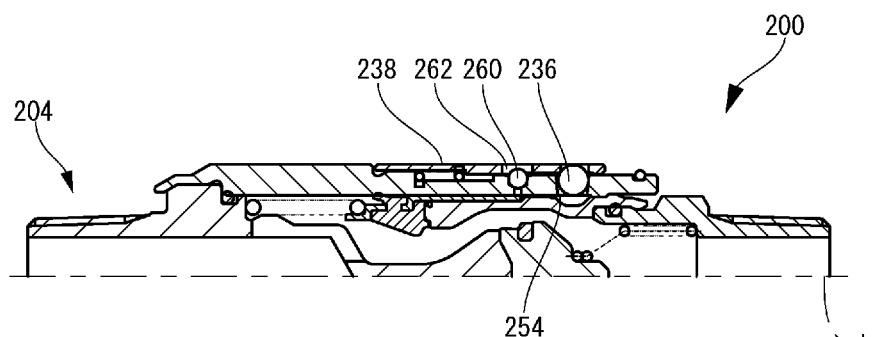
FIG. 7 is a sectional view of the pipe coupling in FIG. 6, showing the pipe coupling in a state where a male pipe coupling member has been inserted in a female pipe coupling member.
Figure 8:
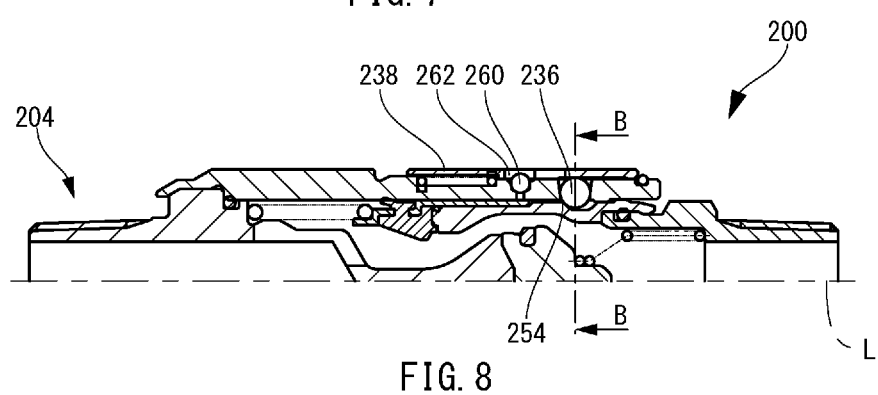
FIG. 8 is a sectional view of the pipe coupling in FIG. 6, showing the pipe coupling in a coupled state.

The female coupling body 132 has a guide ball (first guide part) 160 press-fitted in the outer peripheral surface 140a of the cylindrical peripheral wall portion 140. The sleeve 138 has an L-shaped guide hole (second guide part) 162 formed therein as shown in FIG. 5. The guide ball 160 is located in the guide hole 162. The guide ball 160 limits the movable range of the sleeve 138. The spring 159, which urges the sleeve 138, is installed so as to urge the sleeve 138 toward the forward end thereof (rightward as seen in the figures) in the direction of the longitudinal axis L and also to urge the sleeve 138 clockwise as seen from the forward end side. When the sleeve 138 is in the locking element releasing position (FIG. 1), the guide ball 160 is located in a first end portion 162a of the guide hole 162 to restrict the position of the sleeve 138 in the rotational direction. To displace the sleeve 138 to the locking element holding position, first, the sleeve 138 is moved forward in the direction of the longitudinal axis L until the guide ball 160 is located in a corner portion 162b of the guide hole 162. Next, the sleeve 138 is rotated until the guide ball 160 is located in a second end portion 162c of the guide hole 162. Conversely, to displace the sleeve 138 from the locking element holding position to the locking element releasing position, first, the sleeve 138 is rotated counterclockwise as seen from the forward end side and, thereafter, displaced rearward in the direction of the longitudinal axis L. In the locking element holding position, the locking element receiving hole 154 needs to align with the locking element 136 in both the direction of the longitudinal axis L and the rotational direction. In this regard, however, because the guide ball 160 limits the movable range of the sleeve 138 as stated above, the sleeve 138 is guided toward the locking element releasing position when the sleeve 138 is to be displaced from the locking element holding position to the locking element releasing position. Therefore, it is easy to displace the sleeve 138 to the locking element holding position, where the locking element receiving hole 154 aligns with the locking element 136. It should be noted that because the guide hole 162 has an L-shaped configuration, a rotational operation and a rectilinear operation are required to displace the sleeve 138 from the locking element holding position to the locking element releasing position; therefore, it is possible to prevent the sleeve 138 from being displaced to the locking element releasing position by mistake, which would otherwise bring the pipe coupling 100 into a decouplable state.

Figure 9:
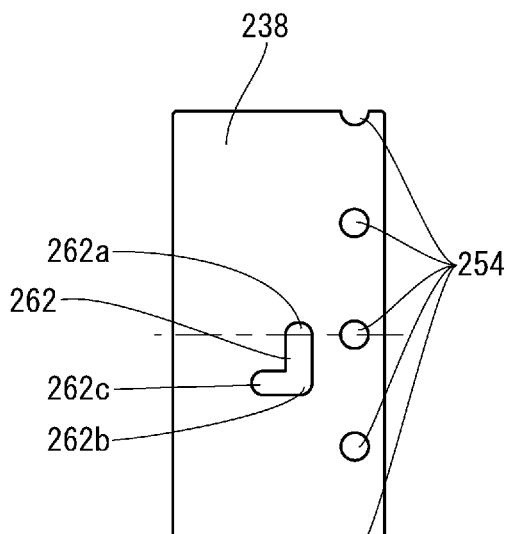
FIG. 9 is a development of a sleeve of the pipe coupling shown in FIG. 6.
Figure 10:
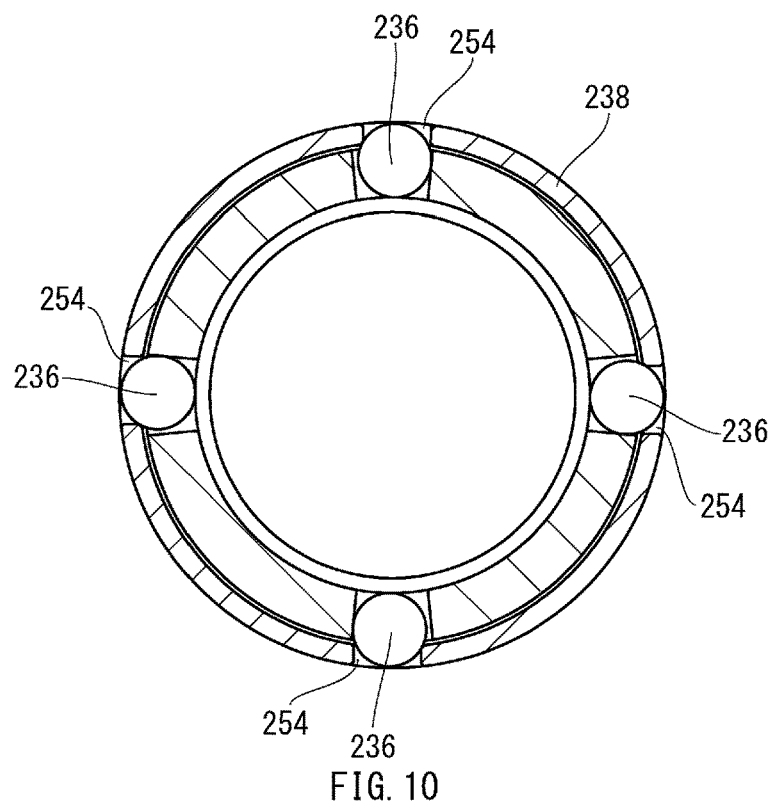
FIG. 10 is a sectional view taken along the line A-A in FIG. 6.
Figure 11:
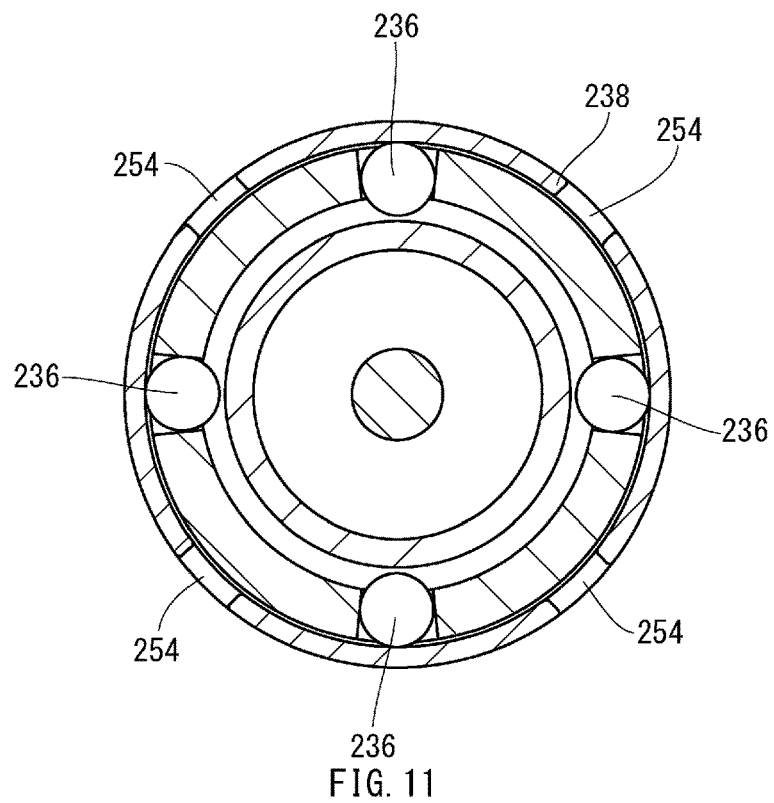
FIG. 11 is a sectional view taken along the line B-B in FIG. 8.

FIGS. 6 to 11 show a pipe coupling 200 according to a second embodiment of the present invention. The pipe coupling 200 differs from the pipe coupling according to the above-described first embodiment in the structure and operation of a sleeve 238 of a female pipe coupling member 204. Specifically, as shown in FIG. 9, the sleeve 238 differs from the sleeve in the first embodiment in the configuration of an L-shaped guide hole 262 formed in the sleeve 238 and also differs therefrom in the operation performed to displace the sleeve 238 between the locking element holding position and the locking element releasing position.

When the sleeve 238 is in the locking element releasing position (FIGS. 6, 7 and 10), a guide ball 260 is located in a first end portion 262a of the guide hole 262 to restrict the position of the sleeve 238 in the direction of the longitudinal axis L. To displace the sleeve 238 to the locking element holding position (FIGS. 8 and 11), first, the sleeve 238 is rotated clockwise as seen from the forward end side until the guide ball 260 is located in a corner portion 262b of the guide hole 262. Next, the sleeve 238 is moved forward in the direction of the longitudinal axis L until the guide ball 260 is located in a second end portion 262c of the guide hole 262. Conversely, to displace the sleeve 238 from the locking element holding position (FIGS. 8 and 11) to the locking element releasing position (FIGS. 6, 7 and 10), first, the sleeve 238 is displaced rearward in the direction of the longitudinal axis L and, thereafter, rotated counterclockwise as seen from the forward end side.

In the female pipe coupling member 104 (204) according to the invention of this application, the locking element 136 (236) is received in the locking element receiving hole 154 (254) provided in the sleeve 138 (238), and the locking element 136 (236) is held in the unlocking position by engaging with the inner opening peripheral edge portion 154a of the locking element receiving hole 154 (254). That is, the invention of this application need not provide a part corresponding to the cover part holding the locking element from radially outside in the above-described conventional technique. Accordingly, it is possible to reduce the outer diameter of the female pipe coupling member 104 (204) relative to the flow path. It should be noted that, although in the illustrated embodiments the locking element receiving hole 154 (254) is smaller in diameter than the locking element 136 (236), the present invention is not limited thereto. Even when the diameter of the locking element receiving hole 154 (254) is larger than that of the locking element 136 (236), the locking element 136 can be held in the unlocking position by the inner opening peripheral edge portion 154a of the locking element receiving hole 154 (254) in the sleeve 138, which is urged by the spring 159. That is, the inner opening peripheral edge portion 154a can clamp the locking element 136 between itself and the inner peripheral surface 134a of the locking element retaining hole 134 to hold the locking element 136 in the unlocking position in the same way as that shown in FIG. 4. Further, the portion that engages the locking element 136 to clamp the latter between itself and the inner peripheral surface 134a is not limited to the inner opening peripheral edge portion 154a of the locking element receiving hole 154 (254) but may be the outer opening peripheral edge portion 154b or the hole inner peripheral surface 154c.

In the foregoing embodiments, the guide hole 162 (262) has an L-shaped configuration and requires a rectilinear operation in the direction of the longitudinal axis L and a rotational operation to displace the sleeve 138 (238) between the locking element holding position and the locking element releasing position. However, the arrangement may be such that the guide hole is formed as a rectilinear hole extending straight in the longitudinal axis direction or in the rotational direction, and that the sleeve is displaced between the locking element holding position and the locking element releasing position by only a rectilinear operation in the longitudinal axis direction or a rotational operation. Further, the guide ball and the guide hole may be configured in any other form that can appropriately limit the movable range of the sleeve relative to the female coupling body. For example, the arrangement may be as follows. A projection is provided on the inner peripheral surface of the sleeve as a guide part, and a groove is formed on the female coupling body as a guide part. The projection and the groove are engaged with each other to limit the movable range of the sleeve. Further, the locking element may have a shape other than a sphere. Regarding the shape thereof, the locking element receiving hole may be a through-hole having a shape other than a circular one, provided that the through-hole receives the locking element placed in the unlocking position and prevents the locking element from passing therethrough radially outward.

LIST OF REFERENCE SIGNS

Pipe coupling 100; male pipe coupling member 102; female pipe coupling member 104; male flow path 110; male coupling body 112; forward cylindrical part 112A; rear cylindrical part 112B; outer peripheral surface 112a; forward end portion 112b; valve element 114; forward end opening 116; valve seat portion 118; spring 120; locking element engaging groove 122; female flow path 130; female coupling body 132; forward cylindrical part 132A; rear cylindrical part 132B; outer peripheral surface 132a; locking element retaining hole 134; inner peripheral surface 134a; inner opening portion 134b; locking element 136; outer top 136a; sleeve 138; outer peripheral surface 138a; inner peripheral surface 138b; cylindrical peripheral wall portion 140; outer peripheral surface 140a; inner peripheral surface 140b; valve seat portion 142; slide valve 144; valve element 146; outer lip portion 146a; inner lip portion 146b; vacuum suction space 146c; valve element support member 148; spring 150; forward end opening 152; locking element receiving hole 154; inner opening peripheral edge portion 154a; outer opening peripheral edge portion 154b; hole inner peripheral surface 154c; recess 156; spring 159; guide ball 160; guide hole 162; first end portion 162a; corner portion 162b; second end portion 162c; pipe coupling 200; female pipe coupling member 204; locking element 236; sleeve 238; locking element receiving hole 254; guide ball 260; guide hole 262; first end portion 262a; corner portion 262b; second end portion 262c; longitudinal axis L.

The invention claimed is:

1. A female pipe coupling member detachably couplable to an associated male pipe coupling member, the female pipe coupling member comprising:
   a coupling body having a cylindrical peripheral wall portion configured to receive the male pipe coupling member, the coupling body further having a locking element retaining hole radially extending through the cylindrical peripheral wall portion;
   a locking element disposed in the locking element retaining hole, the locking element being displaceable between a locking position where the locking element partly projects inward from the cylindrical peripheral wall portion to lock the male pipe coupling member received in the cylindrical peripheral wall portion and an unlocking position where the locking element is located outward of the locking position to unlock the male pipe coupling member and where the locking element partly projects outward from the cylindrical peripheral wall portion; and
   a sleeve having an inner peripheral surface and an outer peripheral surface, the sleeve being disposed to circumferentially surround the cylindrical peripheral wall portion and displaceable along an outer peripheral surface of the cylindrical peripheral wall portion, the sleeve having a locking element receiving hole extending through the sleeve from the inner peripheral surface to the outer peripheral surface, the locking element receiving hole having an inner opening peripheral edge portion opening on the inner peripheral surface, an outer opening peripheral edge portion opening on the outer peripheral surface, and a hole inner peripheral surface extending between the inner opening peripheral edge portion and the outer opening peripheral edge portion, the sleeve being displaceable between a locking element releasing position where the locking element receiving hole radially aligns with the locking element retaining hole to receive a part of the locking element projecting outward from the cylindrical peripheral wall portion, thereby allowing the locking element to assume the unlocking position, and a locking element holding position where the locking element receiving hole does not radially align with the locking element retaining hole and where the inner peripheral surface of the sleeve holds the locking element in the locking position, wherein when the sleeve is in the locking element releasing position, one selected from a group of the inner opening peripheral edge portion, outer opening peripheral edge portion and hole inner peripheral surface of the locking element receiving hole engages the locking element to block the locking element from passing through the sleeve radially outward.

2. The female pipe coupling member of claim 1, wherein the locking element is a spherical member, and the locking element receiving hole is a circular hole having a diameter smaller than that of the locking element.

3. The female pipe coupling member of claim 2, wherein the inner peripheral surface of the sleeve has a recess formed thereon, and the inner opening peripheral edge portion of the locking element receiving hole opens into the recess and is thus located away from an outer peripheral surface of the coupling body, the inner opening peripheral edge portion engaging the locking element when the sleeve is in the locking element releasing position.

4. The female pipe coupling member of claim 2, wherein when the locking element is in the unlocking position, a radial top of the locking element is substantially flush with the outer peripheral surface of the sleeve.

5. The female pipe coupling member of claim 1, wherein the inner peripheral surface of the sleeve has a recess formed thereon, and the inner opening peripheral edge portion of the locking element receiving hole opens into the recess and is thus located away from an outer peripheral surface of the coupling body, the inner opening peripheral edge portion engaging the locking element when the sleeve is in the locking element releasing position.

6. The female pipe coupling member of claim 5, wherein when the locking element is in the unlocking position, a radial top of the locking element is substantially flush with the outer peripheral surface of the sleeve.

7. The female pipe coupling member of claim 6 further comprising:
   a first guide part provided on the coupling body; and
   a second guide part provided on the sleeve;
   wherein when the sleeve is displaced from the locking element holding position to the locking element releasing position, the first guide part and the second guide part engage each other to guide the sleeve toward the locking element holding position.

8. The female pipe coupling member of claim 1, wherein when the locking element is in the unlocking position, a radial top of the locking element is substantially flush with the outer peripheral surface of the sleeve.

9. The female pipe coupling member of claim 1, further comprising:
   a first guide part provided on the coupling body; and
   a second guide part provided on the sleeve;
   wherein when the sleeve is displaced from the locking element releasing position to the locking element holding position, the first guide part and the second guide part engage each other to guide the sleeve toward the locking element holding position.

10. A pipe coupling comprising:
    the female pipe coupling member of claim 1; and
    a male pipe coupling member detachably couplable to the female pipe coupling member.

* * * * *